(12) United States Patent
Ko et al.

(10) Patent No.: US 8,009,298 B2
(45) Date of Patent: Aug. 30, 2011

(54) METHOD AND APPARATUS FOR ACQUIRING REFERENCE GRATING OF THREE-DIMENSIONAL MEASUREMENT SYSTEM USING MOIRE

(75) Inventors: Kuk-Won Ko, Seongnam-si (KR); Yu-Hyun Moon, Namyangju-si (KR)

(73) Assignees: Industry-University Cooperation Foundation Sunmoon University, Asan-si, Chungnam (KR); Kuk-Won Ko, Seongnam-si, Gyeonggi-do (KR)

( * ) Notice: Subject to any disclaimer, the term of this patent is extended or adjusted under 35 U.S.C. 154(b) by 354 days.

(21) Appl. No.: 12/388,354

(22) Filed: Feb. 18, 2009

(65) Prior Publication Data

US 2009/0279102 A1 Nov. 12, 2009

(30) Foreign Application Priority Data

May 7, 2008 (KR) .................. 10-2008-0042578

(51) Int. Cl.
*G01B 11/24* (2006.01)
*G01B 11/30* (2006.01)
(52) U.S. Cl. .................. 356/605; 356/601; 356/610
(58) Field of Classification Search ........... 356/600–640
See application file for complete search history.

(56) References Cited

U.S. PATENT DOCUMENTS

| 4,564,295 | A | * | 1/1986 | Halioua | 356/605 |
| 4,794,550 | A | * | 12/1988 | Greivenkamp, Jr. | 702/167 |
| 5,069,549 | A | * | 12/1991 | Harding | 356/605 |
| 7,489,832 | B2 | * | 2/2009 | Makino et al. | 382/287 |
| 7,787,692 | B2 | * | 8/2010 | Noguchi et al. | 382/167 |
| 2007/0171288 | A1 | * | 7/2007 | Inoue et al. | 348/241 |

* cited by examiner

*Primary Examiner* — Gregory J Toatley
*Assistant Examiner* — Jarreas C Underwood
(74) *Attorney, Agent, or Firm* — Sherr & Vaughn, PLLC

(57) ABSTRACT

Disclosed herein is a method of acquiring a reference grating of a three-dimensional measurement system using moiré, wherein the three-dimensional measurement system includes a light source, a projection grating, a grating actuator and a camera, and analyzes the moiré pattern acquired through the camera to measure the shape of the object. The method includes the steps of acquiring an initial reference grating using the light source and the projection grating, confirming whether or not the acquired initial reference grating includes noise through a noise detector, and moving the projection grating through the grating actuator to acquire the next reference grating when the initial reference grating does not include noise and correcting the reference grating when the reference grating includes noise. The method can remove the noise included in the reference grating to improve the accuracy of measurement of an object.

4 Claims, 9 Drawing Sheets

CALCULATED LINE SLOPE

METHOD AND APPARATUS FOR ACQUIRING REFERENCE GRATING OF THREE-DIMENSIONAL MEASUREMENT SYSTEM USING MOIRE

CROSS REFERENCE TO PRIOR APPLICATIONS

This application claims priority to and the benefit of Korean Patent Application No. 10-2008-0042578 filed on May 7, 2008, which is hereby incorporated by reference in its entirety.

BACKGROUND OF THE INVENTION

1. Field of the Invention

The present invention relates to a method and apparatus for acquiring a reference grating of a three-dimensional measurement system using moiré and, more particularly, to a method and apparatus for acquiring a correct reference grating of a three-dimensional measurement system using moiré to accurately measure the shape of a target object.

2. Background of the Related Art

In general, there are two techniques of measuring the three-dimensional shape of a free-form surface. A technique has been widely used which measures points on a curved surface one by one in a contact manner using a three-dimensional measuring device to measure the shape of the overall surface. However, disadvantageously, this method requires an excessively long measurement time. Accordingly, a non-contact type optical method referred to as a moiré method has been frequently used in recent days. This method has an advantage in that a measurement time is remarkably reduced as compared to the contact method using a three-dimensional measuring device.

Various studies have been carried out on moiré effect by many people since the moiré effect was initially proposed as a scientific tool by Lord Rayleigh in 1874. In particular, moiré became a useful tool for analyzing the strain of an object in mechanical engineering fields since it was used to measure the in-plane of an object.

Since Meadows, Takasaki et al. proposed that the moiré effect was used to measure the out-of-plane shape of an object in 1970, a three-dimensional shape measurement method using the moiré effect came into the spotlight. Moiré is divided into shadow moiré and projection moiré according to the method of forming a moiré pattern.

The moiré is required to form straight stripes on a target object at a predetermined interval and accurately move the straight stripes in order to acquire a moiré pattern having three-dimensional shape information. To achieve this, a conventional method projects a straight-line glass grating, which is obtained by engraving straight stripes at a predetermined interval on one side of glass with chrome, to a target object using a projection optical system.

Furthermore, straight stripes formed on the target object are moved at a predetermined interval using a straight-line glass grating actuator. When the straight-line glass grating is projected to the target object, stripes are formed on the target object. These stripes are curved according to the height of the target object.

When the target object on which the stripes are formed is overlapped with the straight-line glass grating, a moiré pattern can be obtained. This moiré pattern is a contour formed according to the height of the target object, and thus the moiré pattern is analyzed to measure the shape of the target object.

A phase shifting moiré measuring device which is a currently frequently used device using moiré includes a white light source, a condenser, a projection grating and a projection lens and projects the projection grating to an object to form deformed stripes. A grating actuator moves the projection grating by 3 to 5 steps at an equal interval. A CCD camera acquires a moiré pattern according to a reference grating identical to the projection grating, a relay lens and an imaging lens.

However, an image obtained by the aforementioned conventional moiré measuring device simultaneously includes a moiré pattern representing height information of a target object and the pattern of the reference grating placed in front of the CCD camera. Accordingly, an additional device for removing the image of the reference grating is required, and thus the structure of the measuring device becomes complicate.

To address and solve this problem, light is irradiated to a plane on which an object is not placed through a projection grating without using a reference grating, as illustrated in FIG. 1, to acquire a grating pattern (reference grating) as illustrated in FIG. 2. Then, the object is located and a moiré pattern of the object is obtained to measure the shape of the object. However, in the process of obtaining the reference grating, an invisible reference grating is acquired because of grating bending, noise caused by particles, and ununiform reference grating pitch due to unevenness of the plane to which light is irradiated, as illustrated in FIG. 2. When this reference grating is applied to measure the shape of the object, a measurement error is generated.

SUMMARY OF THE INVENTION

Accordingly, the present invention has been made in an effort to solve the above-mentioned problems occurring in the prior art, and it is a primary object of the present invention to provide a method and apparatus for acquiring a reference grating of a three-dimensional measurement system using moiré, which minimize the rate of generation of a shape measurement error of an object caused by noise generated when the reference grating is acquired to correctly measure the shape of the object.

To accomplish the above object of the present invention, according to an aspect of the present invention, there is provided a method of acquiring a reference grating of a three-dimensional measurement system using moiré, wherein the three-dimensional measurement system comprises a light source for emitting light, a projection grating for generating a grating pattern, a grating actuator for moving the projection grating and a camera for acquiring the reference grating and a moiré pattern obtained from an object, and analyzes the moiré pattern acquired through the camera to measure the shape of the object, the method comprising the steps of acquiring an initial reference grating using the light source and the projection grating, confirming whether or not the acquired initial reference grating includes noise through a noise detector, and moving the projection grating through the grating actuator to acquire the next reference grating when the initial reference grating does not include noise and correcting the reference grating when the reference grating includes noise.

The step of moving the projection grating to acquire the next reference grating and the step of confirming whether or not the acquired reference grating includes noise may be repeated after the step of correcting the reference grating.

The step of correcting the reference grating may comprise the steps of binarizing the acquired reference grating, thinning the reference grating such that central points of lines of the binarized reference grating are detected and portions of the lines other than the central points are eliminated to leave only the central points, substituting the central points to a linear equation to obtain optimum straight lines that closely pass through the central points, calculating the slope of the reference grating using the straight lines, and obtaining a distance between neighboring straight lines corresponding to central lines of the grating and generating a grating using the distance.

According to another aspect of the present invention, there is provided an apparatus of acquiring a reference grating of a three-dimensional measurement system using moiré, wherein the three-dimensional measurement system comprises a light source for emitting light, a projection grating for generating a grating pattern, a grating actuator for moving the projection grating and a camera for acquiring the reference grating and a moiré pattern obtained from an object, and analyzes the moiré pattern acquired through the camera to measure the shape of the object, the apparatus comprising a noise detector for detecting whether or not the acquired reference grating includes noise and removing the noise when the reference grating includes the noise to correct the reference grating, and a controller for controlling the grating actuator to move the projection grating in order to acquire the next reference grating when the noise detector does not detect noise from the reference grating, correct the reference grating according to the noise detector and then move the projection grating when the reference grating includes noise.

The noise detector may be a personal computer.

The present invention acquires a reference grating, detects whether the reference grating has noise and corrects the reference grating when the reference grating has noise. Accordingly, a correct moiré pattern of an object can be acquired, and thus the shape of the object can be correctly measured.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Embodiments of a method and apparatus for acquiring a reference grating of a three-dimensional measuring system using moiré will be explained with reference to the attached drawings.

Figure 1:
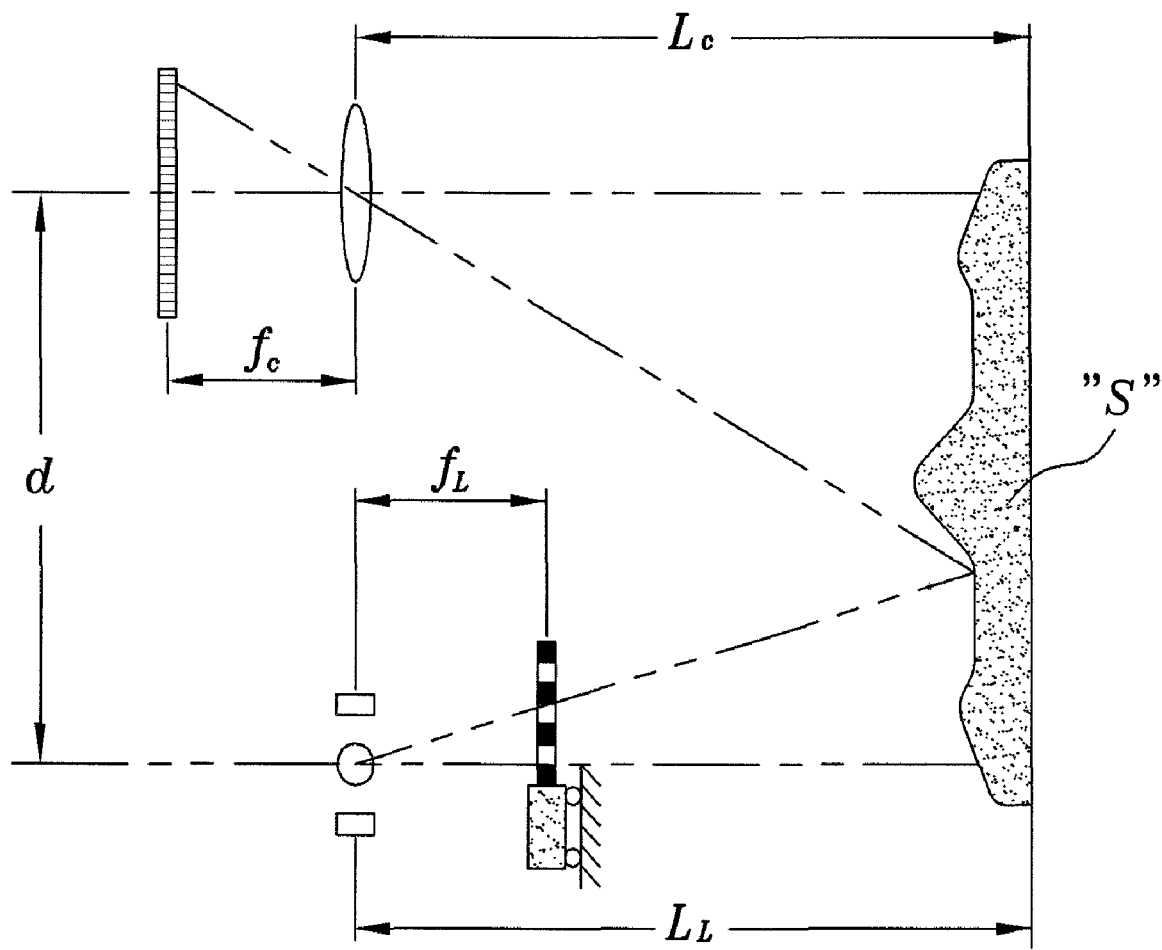
FIG. 1 illustrates a configuration of a conventional moiré measurement system.
Figure 2:
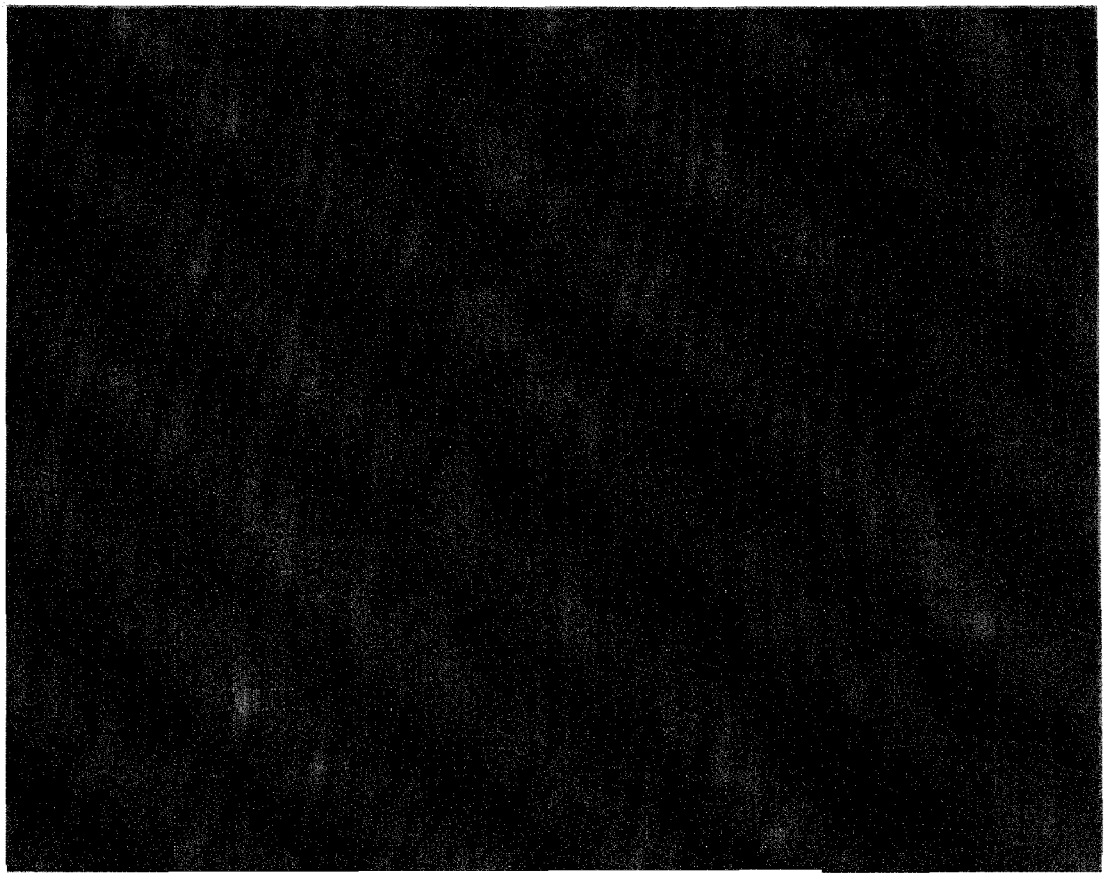
FIG. 2 illustrates a reference grating acquired by a conventional reference grating acquisition method.
Figure 3:
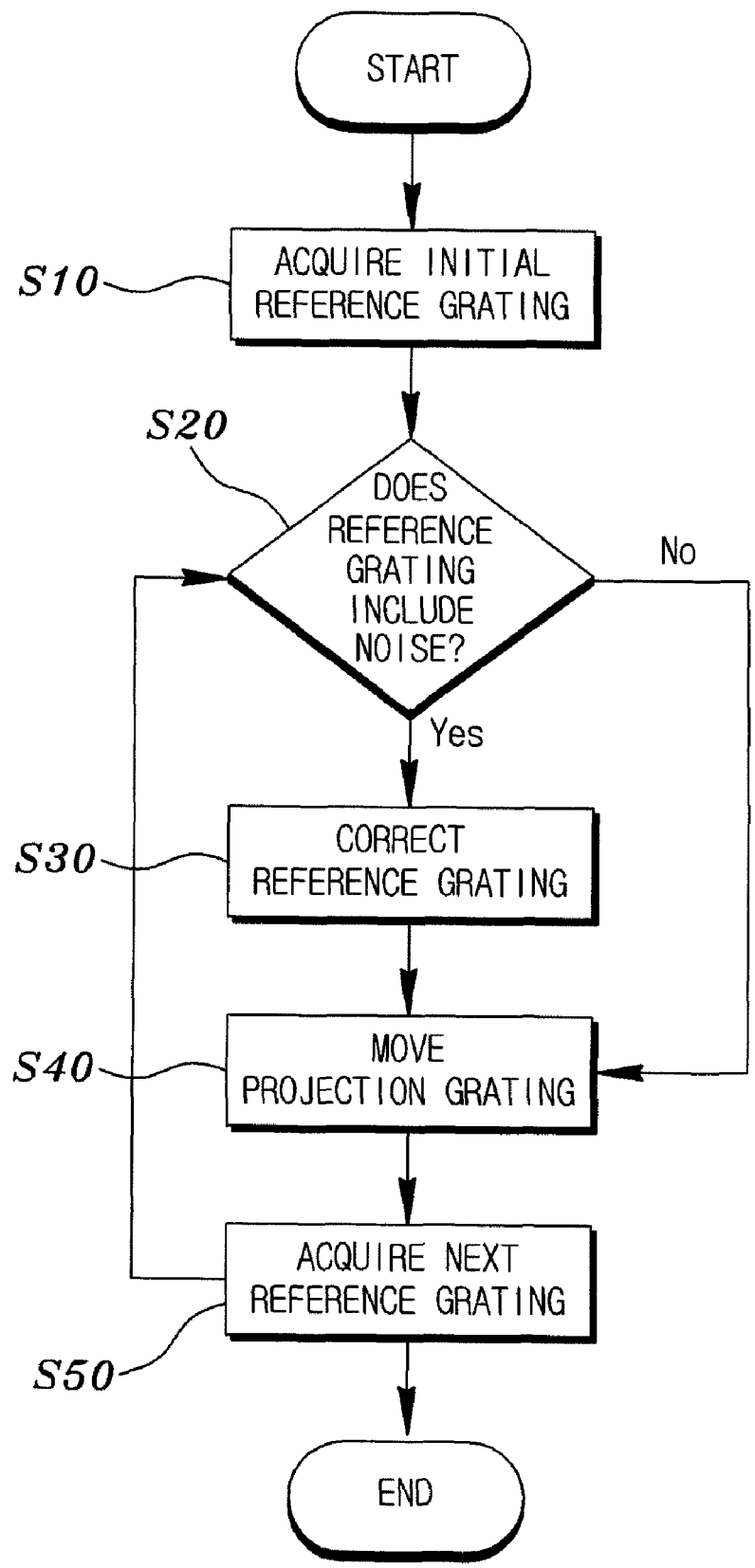
FIG. 3 is a flow chart of a method of acquiring a reference grating of a three-dimensional measurement system using moiré according to the present invention.
Figure 4:
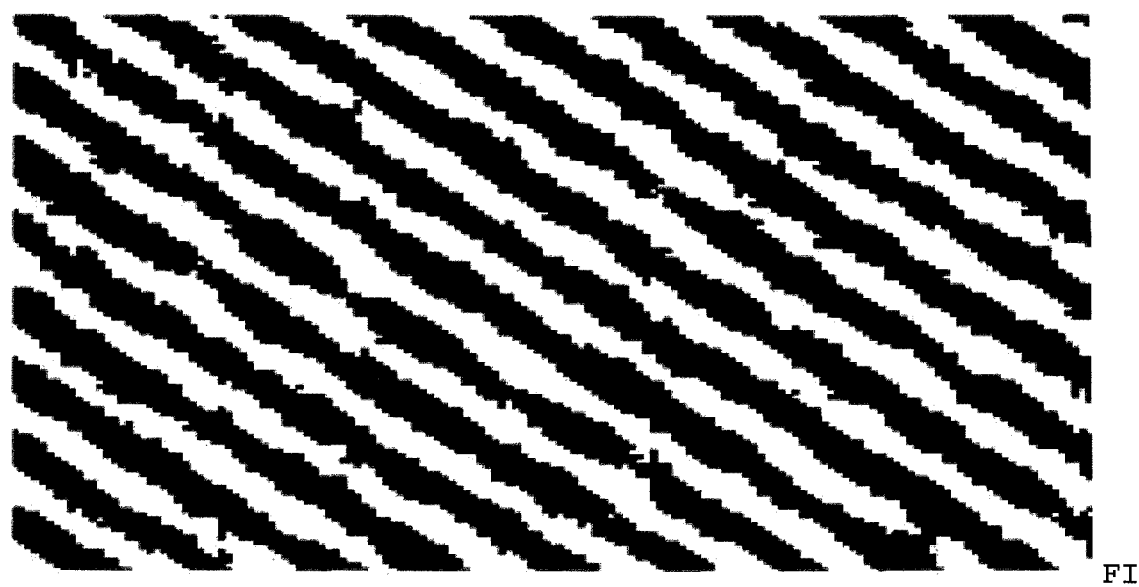
FIG. 4 illustrates an image subjected to thresholding in the method of acquiring a reference grating according to the present invention.
Figure 5:
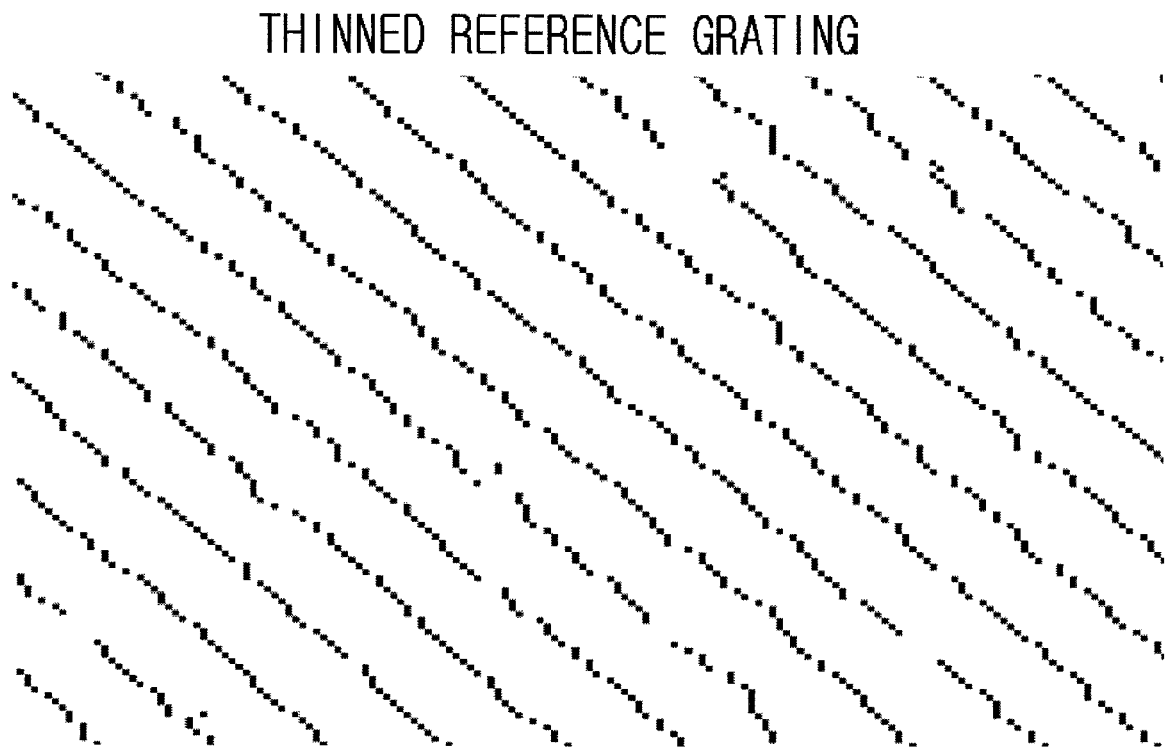
FIG. 5 illustrates an image thinned in the method of acquiring a reference grating according to the present invention.
Figure 6:
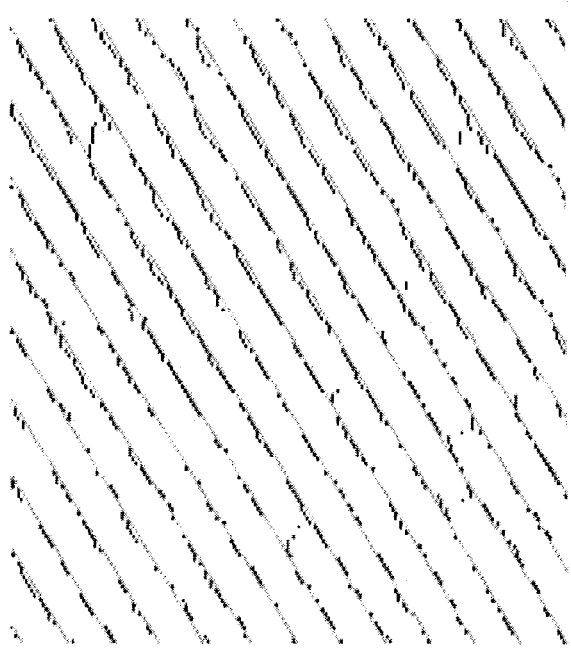
FIG. 6 illustrates straight lines generated according to the slope of a reference grating in the method of acquiring a reference grating according to the present invention.
Figure 6:
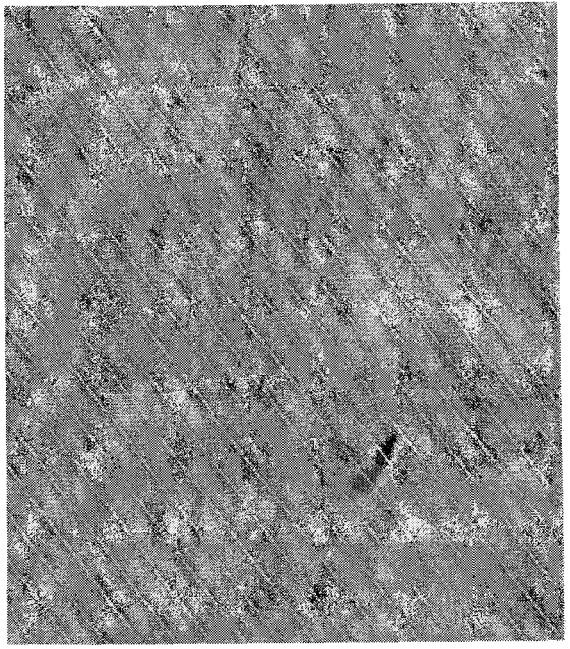
Figure 7:
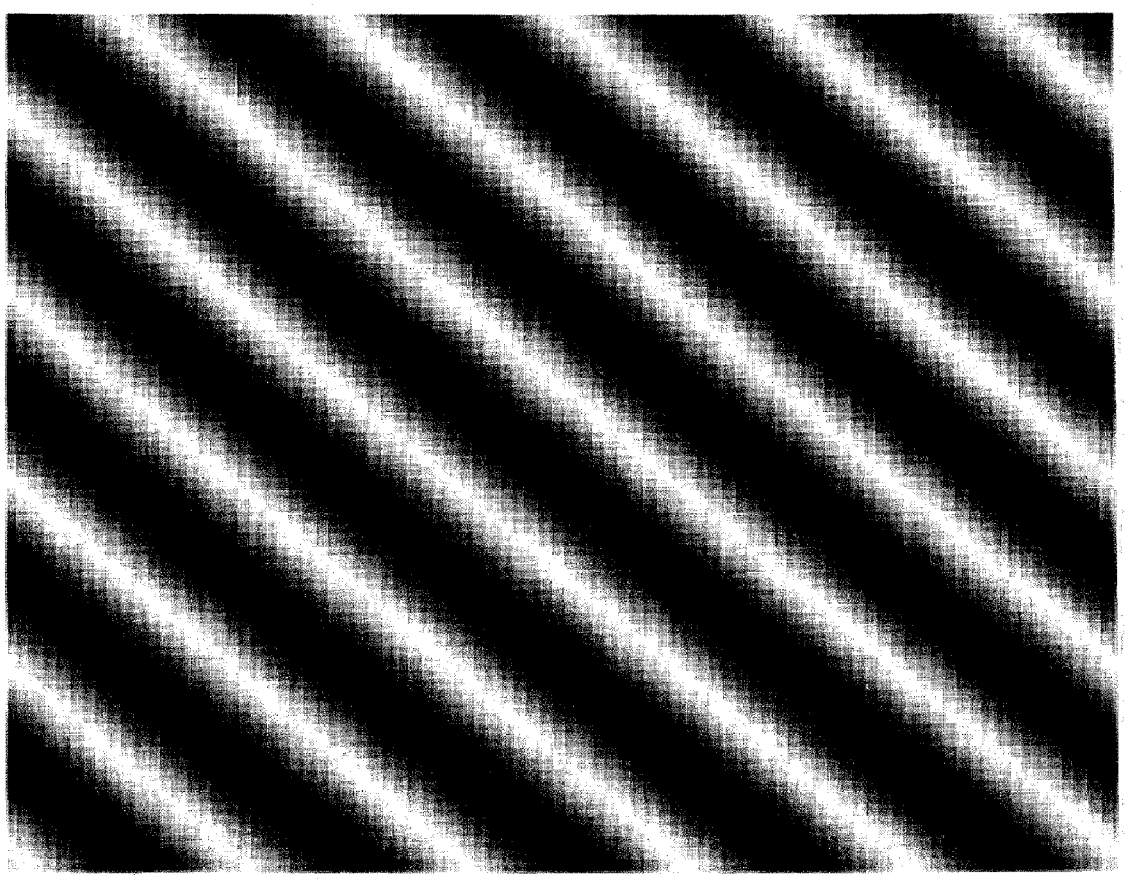
FIG. 7 illustrates a noise-free reference grating acquired through the method of acquiring a reference grating according to the present invention.
Figure 8:
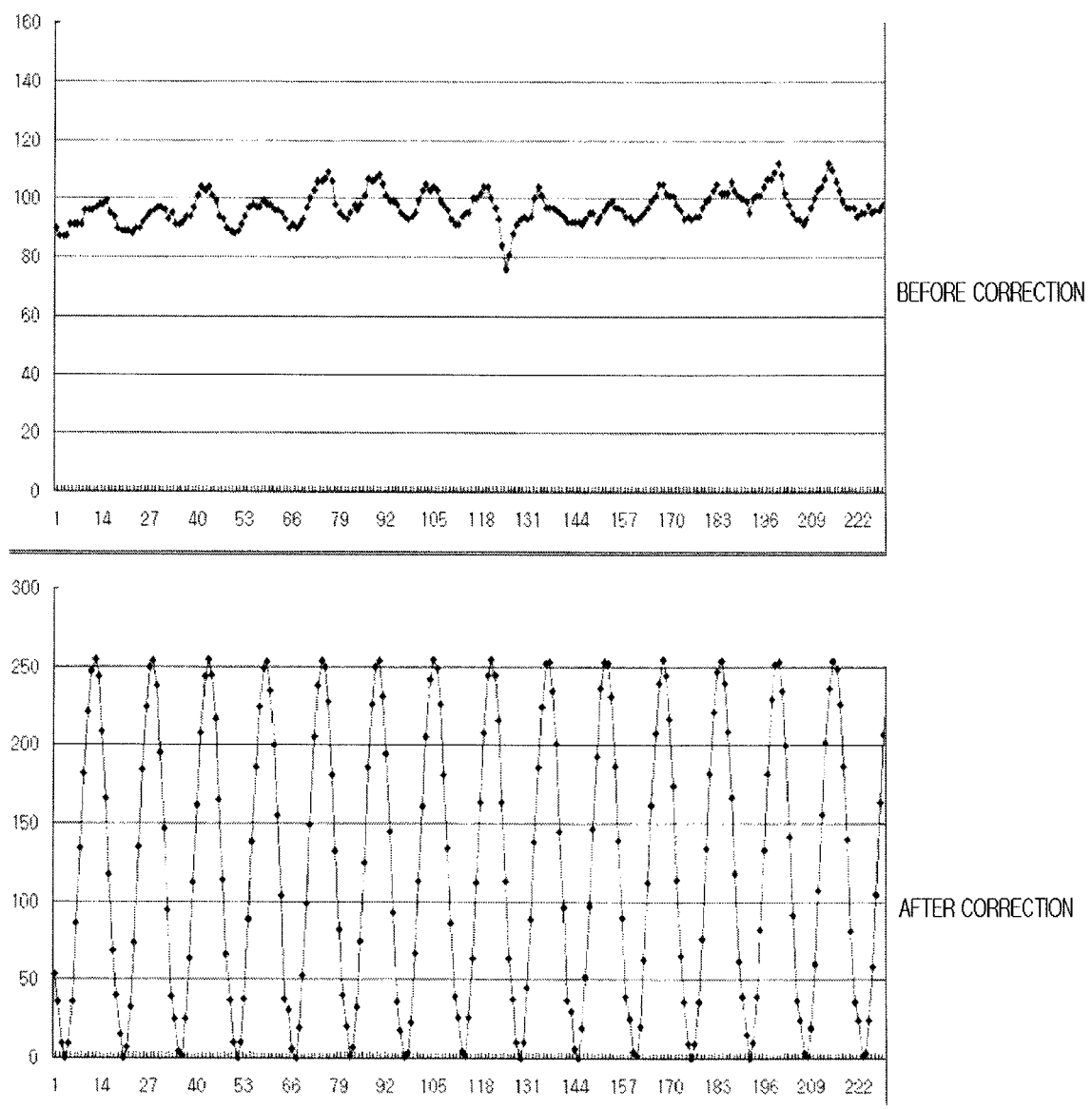
FIG. 8 are graphs illustrating gray levels and periods before and after correction.
Figure 9:
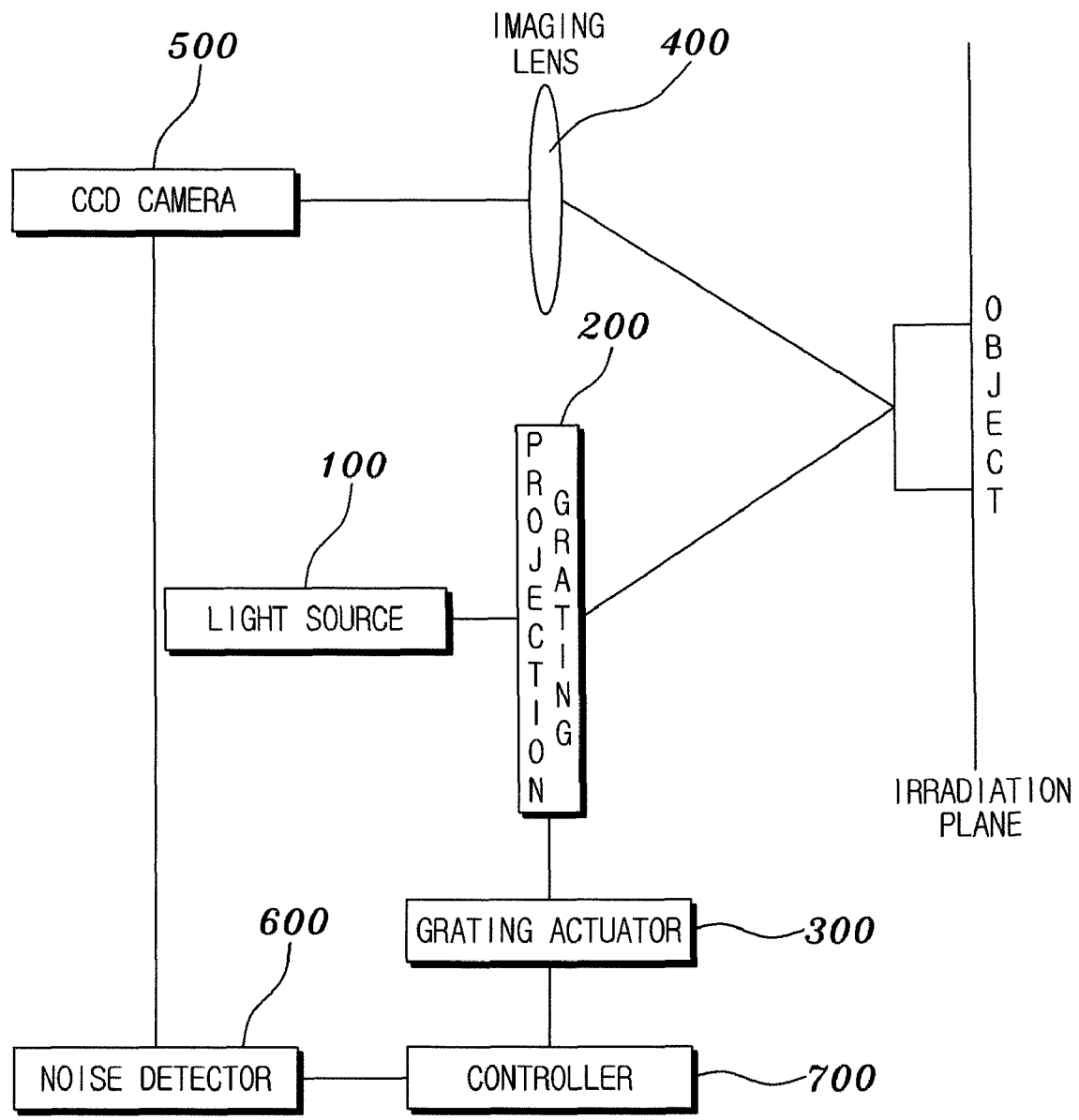
FIG. 9 illustrates a configuration of an apparatus of acquiring a reference grating of a three-dimensional measurement system using moiré according to the present invention.

FIG. 3 is a flow chart of a method of acquiring a reference grating of a three-dimensional measurement system using moiré according to the present invention, FIG. 4 illustrates an image subjected to thresholding in the method of acquiring a reference grating according to the present invention, FIG. 5 illustrates an image thinned in the method of acquiring a reference grating according to the present invention, FIG. 6 illustrates straight lines generated according to the slope of a reference grating in the method of acquiring a reference grating according to the present invention, FIG. 7 illustrates a noise-free reference grating acquired through the method of acquiring a reference grating according to the present invention, FIG. 8 are graphs illustrating gray levels and periods before and after correction, and FIG. 9 illustrates a configuration of an apparatus of acquiring a reference grating of a three-dimensional measurement system using moiré according to the present invention.

According to an embodiment of the present invention, a method of acquiring a reference grating in a three-dimensional measurement system using moiré, which includes a light source 100, a projection grating 200 for generating a grating pattern, a grating actuator 300 for moving the projection grating 200 and a camera 500 for obtaining a moiré pattern from the reference grating and an object, includes a step S10 of acquiring an initial reference grating through the light source 100 and the projection grating 200, a step S20 of confirming whether or not the initial reference grating includes noise through a noise detector, a step S30 of correcting the reference grating when the reference grating includes noise, a step S40 of moving the projecting grating 200 using the grating actuator 300 when the initial reference grating has no noise, and a step S50 of acquiring the next reference grating. The steps S40 and S50 are repeated until all of reference gratings are acquired.

The method of acquiring a reference grating of a three-dimensional measurement system using moiré will now be explained in more detail. Referring to FIGS. 3 through 9, light emitted from the light source 100 is irradiated to a plane on which an object will be placed through the projection grating 200. Here, the light is irradiated to the plane through the projection grating 200 without locating the object thereon to acquire a reference grating. The reference grating reflected from the irradiated plane passes through an imaging lens 400 such that the CCD camera 500 acquires the reference grating in step S10.

After the step S10, that is, after the initial reference grating is acquired, it is confirmed whether the initial reference grating includes noise through the noise detector 600 in the step S20. The noise included in the reference grating is caused by invisible particles such as fine dust adhering to the plane, grating nonlinearity due to unevenness of the plane, a variation in the grating pitch according to reflectivity and so on.

To detect noise included in the reference grating, the noise detector 600 analyzes the image (reference grating) acquired by the CCD camera 500 through image analysis software using an algorithm or easily detects images (noise) other than the reference grating through histogram distribution of the acquired image (reference grating).

A preferred correction method according to the present invention will now be explained. The acquired image (reference grating) is binarized through thresholding to obtain a binarized image. Specifically, values smaller than a reference value is processed into "0" and values greater than the reference value is processed into "1" to acquire an approximate contour of the reference grating.

The reference grating binarized through thresholding is thinned, as illustrated in FIG. 5. Specifically, the thickness of each grating line is numbered and portions of each line other than the center thereof are thinned having the center as a check center.

Central points of thinned lines are substituted to a linear equation to obtain optimum straight lines that closely pass through the central points, and then the slope of the reference grating is calculated through the straight lines. Here, an optimum straight line passing through N discrete points included in a central line is obtained. The optimum straight line passing through the N points corresponds to a straight line on which the sum of the squares of deviations of the points becomes a minimum. Finally, a distance between neighboring straight lines corresponding to central lines of the grating is obtained and a grating is generated using the distance.

Referring to FIG. 6, A illustrates straight lines generated according to the slope of the grating and B illustrates combination of grating lines and the generated straight lines.

The central lines of the grating represent a perpendicular distance between neighboring straight lines and a period of the straight lines, and thus a distinct reference grating can be acquired.

It is desirable that the noise detector 600 corresponds to a personal computer in which the image analysis software is installed. It is confirmed whether the initial reference grating includes noise through the noise detector 600 in the step S20 and the acquired image corresponding to the initial reference grating is corrected when the noise is detected in the step S30, as described above.

FIG. 7 illustrates the reference grating after correction. It can be known from FIG. 7 that the corrected reference grating is distinct.

After the reference grating is corrected, the projection grating 200 is moved in the step S40 to acquire the next reference grating in the step S50. Here, the noise detector 600 is operated in connection with a controller 700 for controlling the grating actuator 300 which moves the projection grating 200 to apply a control signal for controlling the grating actuator 300 in order to acquire the next reference grating when it is determined that the reference grating does not include noise and to apply the control signal after the reference grating is corrected when it is determined that the reference grating includes noise.

After the initial reference grating is acquired, the steps S20, S30 and S40 are repeated until a final reference grating is obtained.

Correct reference gratings are acquired through the aforementioned operation, and then the object is located on the plane to obtain a moiré pattern with respect to the object. A final moiré pattern is obtained using the previously acquired reference gratins and the noire pattern of the object to measure the three-dimensional shape of the object.

The present invention can acquire a reference grating, confirm whether the reference grating includes noise and remove the noise when the reference grating includes the noise to correctly measure the shape of an object.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method of acquiring a reference grating of a three-dimensional measurement system using moiré, wherein the three-dimensional measurement system comprises a light source for emitting light, a projection grating for generating a grating pattern, a grating actuator for moving the projection grating and a camera for acquiring the reference grating and a moiré pattern obtained from an object, and analyzes the moiré pattern acquired through the camera to measure the shape of the object, the method comprising the steps of:
   acquiring an initial reference grating using the light source and the projection grating;
   confirming whether or not the acquired initial reference grating includes noise through a noise detector; and
   moving the projection grating through the grating actuator to acquire the next reference grating when the initial reference grating does not include noise and correcting the reference grating when the reference grating includes noise,
   wherein correcting the reference grating comprises:
   binarizing the acquired reference grating;
   thinning the reference grating such that central points of lines of the binarized reference grating are detected and portions of the lines other than the central points are eliminated to leave only the central points;
   substituting the central points to a linear equation to obtain optimum straight lines that closely pass through the central points;
   calculating the slope of the reference grating using the straight lines; and
   obtaining a distance between neighboring straight lines corresponding to central lines of the grating and generating a grating using the distance.

2. A method according to claim 1, wherein the step of moving the projection grating to acquire the next reference grating and the step of confirming whether or not the acquired reference grating includes noise are repeatedly performed after the step of correcting the reference grating.

3. An apparatus of acquiring a reference grating of a three-dimensional measurement system using moiré, wherein the three-dimensional measurement system comprises a light source for emitting light, a projection grating for generating a grating pattern, a grating actuator for moving the projection grating and a camera for acquiring the reference grating and a moiré pattern obtained from an object, and analyzes the moiré pattern acquired through the camera to measure the shape of the object, the apparatus comprising:
   a noise detector for detecting whether or not the acquired reference grating includes noise and removing the noise when the reference grating includes the noise to correct the reference grating; and
   a controller for controlling the grating actuator to move the projection grating in order to acquire the next reference grating when the noise detector does not detect noise from the reference grating, correct the reference grating according to the noise detector and then move the projection grating when the reference grating includes noise,
   wherein the noise detector includes an image analysis algorithm configured to:
   binarize the acquired reference grating;
   thin the reference grating such that central points of lines of the binarized reference grating are detected and portions of the lines other than the central points are eliminated to leave only the central points;

substitute the central points to a linear equation to obtain optimum straight lines that closely pass through the central points;

calculate the slope of the reference grating using the straight lines; and obtain a distance between neighboring straight lines corresponding to central lines of the grating and generating a grating using the distance.

4. The apparatus according to claim 3, wherein the noise detector is a personal computer.

* * * * *